April 6, 1965　　　B. W. SCHARF ETAL　　　3,177,483
VARIABLE INDICIA MULTIPLE UNIT ILLUMINATED READ-OUT INDICATOR
Filed Oct. 17, 1960　　　　　　　　　　　　　2 Sheets-Sheet 1
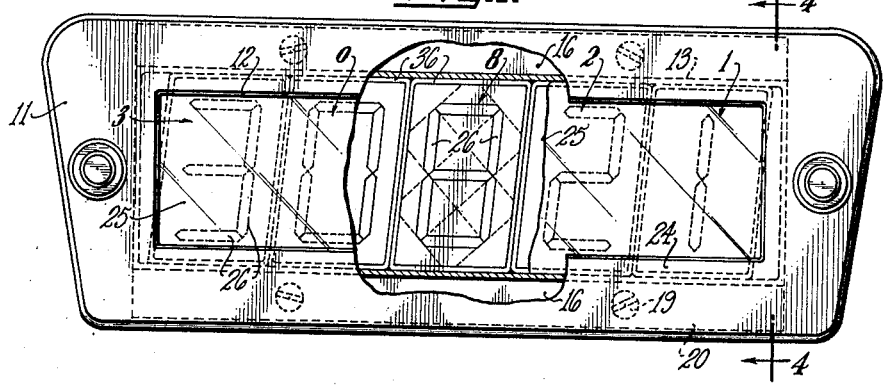
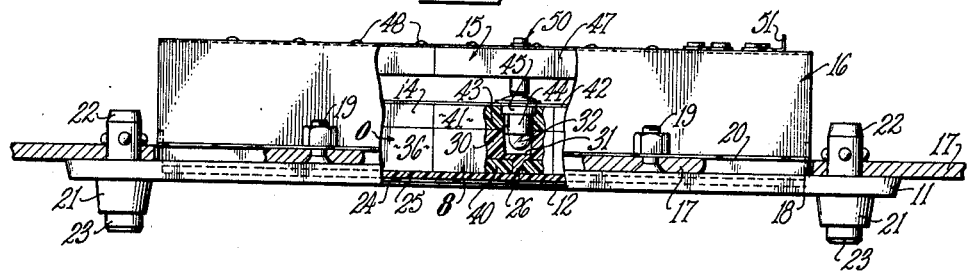
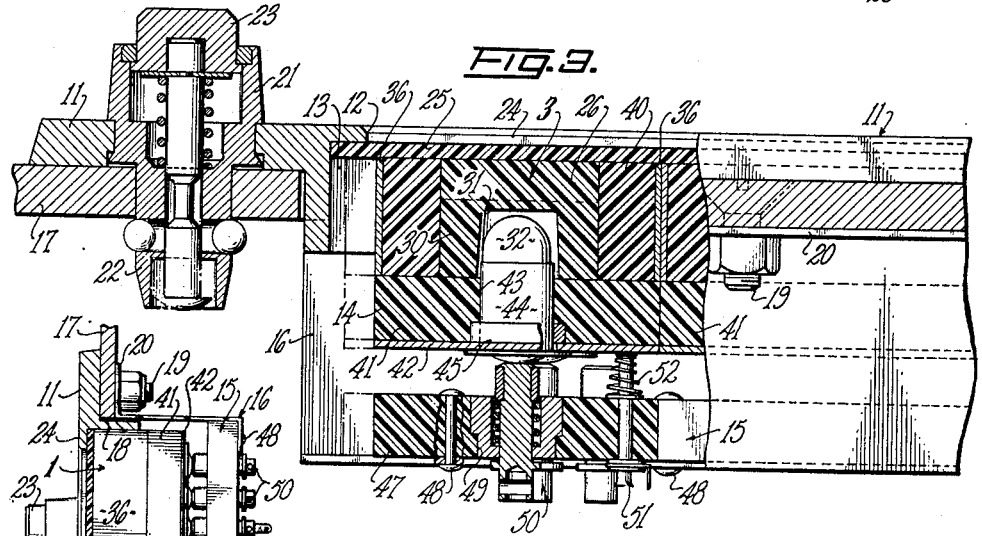
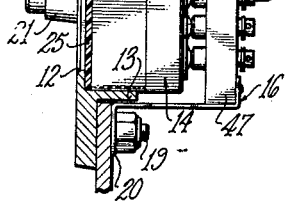
INVENTORS
HERBERT JACOBEL, JR.
BEVERLY W. SCHARF
BY
Lynn H. Latta
ATTORNEY

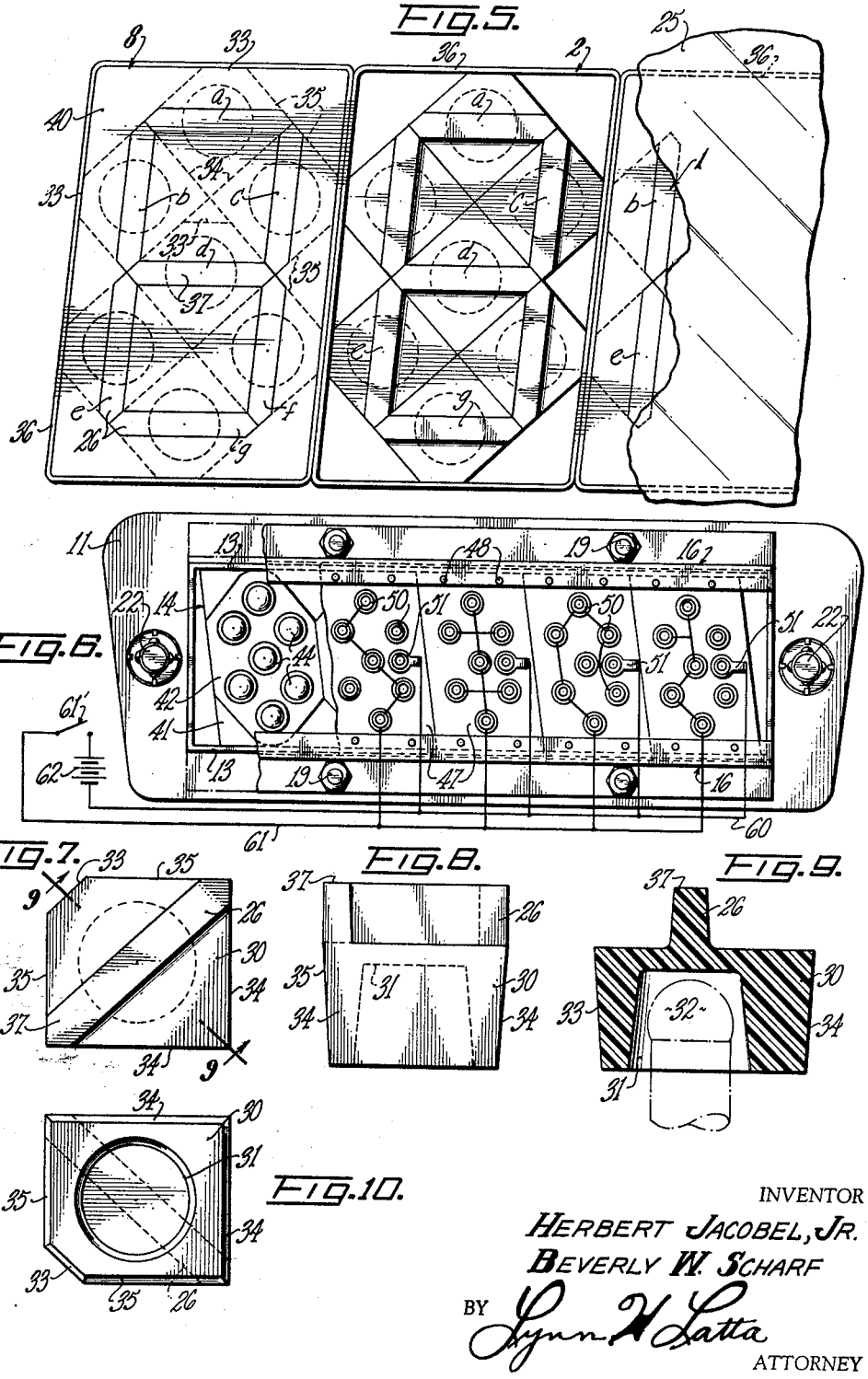

United States Patent Office 3,177,483
Patented Apr. 6, 1965

3,177,483
VARIABLE INDICIA MULTIPLE UNIT ILLUMI-
NATED READ-OUT INDICATOR
Beverly W. Scharf, Orange, and Herbert Jacobel, Jr.,
Anaheim, Calif., assignors to Marco Industries Com-
pany, Anaheim, Calif., a corporation of California
Filed Oct. 17, 1960, Ser. No. 63,012
3 Claims. (Cl. 340—378)

This invention relates to indicator apparatus of the illuminated annunciator or read-out type wherein one or more elongated indicator units bearing indicia such as letters or numerals or combinations thereof, are adapted to be selectively illuminated so as to render such indicia visible or to draw attention thereto. In general, the present invention has as its object to provide an indicator unit having variables means for displaying selectively any one of a series of indicia such as the digits 0 through 9, or a series of letters of the alphabet.

More specifically, the invention aims to provide, in a single indicator unit, means for adjusting the same so as to render it operative to display selectively any one of a series of indicating characters.

Broadly, the invention attains this general object by providing an indicator unit composed of multiple indicator elements each adapted to be separately illuminated and each displaying a respective portion of a composite indicating character, together with a control device for selectively illuminating all or part of said indicator elements in various combinations so as to depict the various indicator characters of the series. For example, the complete group of indicator elements may be arranged to designate the numeral "8"; and the component indicator elements thereof (e.g. individually in the form of a straight bar) can be selectively utilized in various combinations of less than the full group of indicator elements, to indicate the other digits of the Arabic numerals 0 through 9. The invention contemplates the use of a contact block having a series of electrical contacts communicating with respective illuminating elements (e.g. miniature neon bulbs) for individually illuminating the component indicator elements of a group, so that any selected combination of indicator elements in a given group can be illuminated to display the corresponding indicator character. The invention also contemplates the use of a legend plate or window which may be translucent so as to substantially conceal the component indicator elements of the group (or of several adjoining groups) whereby the indicator characters become visible only upon illumination.

A further object of the invention is to provide an indicator unit composed of a group of indicator elements having a particular construction and assembly such as to facilitate the fabrication of the indicator unit by assembling together a plurality of indicator elements of identical form (or utilizing several elements of one identical form and several elements of another identical form), thus simplifying and reducing to minimum cost the fabrication and assembly of the units.

Other objects and advantages will become apparent in the ensuing specifications and appended drawings in which:

FIG. 1 is a front face view of an indicator embodying the invention;

FIG. 2 is a top plan view of the same with portions broken away and shown in section;

FIG. 3 is an enlarged detail sectional view of an end portion thereof;

FIG. 4 is a transverse sectional view thereof, taken on line 4—4 of FIG. 1;

FIG. 5 is a front face view of a series of the indicator units arranged side by side before being mounted in an indicator panel;

FIG. 6 is a rear view of the indicator;
FIG. 7 is a front end view of an indicator element;
FIG. 8 is a plan view of the same;
FIG. 9 is a diagonal sectional view of the same taken on the line 9—9 of FIG. 7;
FIG. 10 is a rear end view of the same.

GENERAL DESCRIPTION

Referring now to the drawings in detail, I have shown therein, as an example of one form in which the invention may be embodied, an array of indicator units indicated generally by the reference numerals 3, 0, 8, 2 and 1 and operative to indicate the corresponding digits "3," "0," "8," "2," and "1."

These indicator units are mounted side by side in a unitary panel structure embodying several of the units. Such panel structure includes a face plate 11 which may be of stamped sheet metal or cast metal or molded synthetic resin plastic material and which has a horizontally elongated sight opening 12 therein, and a pair of vertically spaced parallel horizontally projecting flanges 13 (FIG. 4) between which the units 3 etc. are mounted. The panel assembly includes the indicator units 3 etc.; lamp holders 14 each operative to hold a series of small neon bulbs or the like in illuminating association with indicator elements of respective units 3 etc.; and contact blocks 15 each carrying a group of electrical contacts for establishing energizing circuits to the respective indicator lamps. A pair of Z-brackets 16 are provided to hold the indicator units 3 etc., the lamp holder 14, and the contact block 15 assembled to the face plate 11, and to an instrument panel or the like 17 having a horizontal slot 18 receiving the flanges 13 of face plate 11. Z-brackets 16 may be secured to the rear face of instrument panel 17 by short bolts 19 extending through the panel and through the base flanges 20 of brackets 16. Face plate 11 is adapted to be separately attached to mounting panel 17 by conventional ball-latch fasteners each having a head 21 to engage the forward face of face plate 11, having a shank 22 to project through a respective opening in mounting panel 17 at a respective end of mounting slot 18, and having a retractor button 23 for releasing the latching balls to release the face plate 11 from the mounting panel 17. Window opening 12 is marginally defined by lips 24 projecting inwardly from flanges 13 and from respective end portions of plate 11, the lips 24 and flanges 13 cooperatively defining a rectangular box-like recess 39 (FIGS. 3, 4) in which the indicator units 3, 0, 8, 2, 1 are mounted, with a translucent legend plate 25 interposed between the lips 24 and the forward faces of the indicator units.

DETAILED DESCRIPTION

*Indicia elements—Arrangement.*—Each indicator unit 3, 0, 8, 2, 1, has in its forward face a plurality of flush, illuminable indicia elements of bar form, indicated generally at 26, and arranged in two superimposed groups of regular quadrilateral pattern (such as the two regular parallelograms illustrated, or, optionally, a pair of superimposed squares). The superimposed groups are defined by indicia elements at positions indicated in FIG. 5 at *a, b, c, d,* for the upper group, and indicated by *d, e, f,* and *g,* for the lower group. Indicia element *d* is common to both of the superimposed groups, elements *a* and *g* are horizontal elements at the top and bottom of a respective indicator unit, and elements *b, c, e, f* are vertical elements disposed at the respective sides of the groups. These indicia elements are framed by surrounding flush areas such that they are substantially invisible when not illuminated. In the drawings, the representation of the indicia elements in full lines in FIG. 5 (and in the break-away area of FIG. 1) represents indicia elements rendered visible by illumination, and non-illuminated indicia elements are represented in phantom. In FIG. 1, indicia elements and fragmentary portions thereof lying behind the legend plate 25 are shown in phantom to represent illuminated indicia elements, there being no showing of the non-illuminated elements.

Referring to FIG. 5, it may now be noted that by illuminating all seven of the indicia elements $a$, $b$, $c$, $d$, $e$, $f$, and $g$, that there is provided the representation of the numeral "8" in the indicator unit 8. In the indicator unit 2, the illumination of the top element $a$, the upper right element $c$, the middle element $d$, the lower left element $e$ and the bottom element $g$ provides a representation of the numeral "2." In the indicator unit 1, the illumination of the two leftward vertical elements $b$ and $e$ (or alternatively, the illumination of the two rightward vertical elements $c$ and $f$) will provide a representation of the numeral "1," adjacent the leftward or rightward margin of the unit 1 as the case may be. It would be possible, by employing a modified arrangement of indicia elements within the frame of an indicator unit, to provide a representation of the numeral "1" centered between the lateral margins of the unit, such arrangement being indicated in phantom in FIG. 1 by the dot and dash lines, as will be more fully explained hereinafter.

It will now be apparent that in each of the indicator units 3, 0, 8, 2, 1, the physical structure of the respective units can be identical, and is so represented with the exception of the phantom showing of a modified arrangement for the unit 1. In each case, the complete assembly of indicia elements, if fully illuminated, would represent the numeral "8," and the illumination of less than all of the indicia elements is utilized to represent other indicia characters.

Referring to FIG. 1, the numeral "3" is represented in unit 3 by illumination of the three horizontal indicia elements and the two rightward vertical elements; and the representation of the digit "0" is effected by illuminating all except the central indicia element $d$.

*Indicator unit construction.*—In physical structure (FIGS. 7–10) each of the indicia bars 26 is an integral rib forwardly projecting from the front face of a lens cap having a body 30 of molded translucent plastic material. In its back side is a recess 31 to receive the tip of a small neon bulb 31 or equivalent illuminating element. In plan form, each lens cap 30 may be rectangular as shown, with one corner truncated to provide a bevelled corner face 33. Thus each lens cap has two full-length sides 34 and two truncated sides 35. Seven of the lens caps are assembled as shown in FIG. 5, with their full length sides 34 in mating contact with one another and with their truncated sides 35 facing the four corners of a parallelogram-shaped frame 36 of the proper proportions, which receives the assembly of seven lens caps with the four sides of the frame bearing flatly against the bevelled corner faces 33. In this assembly of the seven lens caps within frame 36, the front faces 37 of indicia bars 26 are positioned in the plane of the forward edges of the frame 36. To complete the indicator unit, the loose assembly of indicator lens caps within frame 36 is supported in a horizontal position upon a horizontal supporting surface and liquid plastic material is then poured into the six triangular spaces between the truncated faces 35 of the lens caps and the four corners and two intermediate lateral portions of frame 36, and into the small triangular space between the truncated corner 33 of the central lens cap at position $d$ and the adjacent sides of adjoining lens caps. Additional resin is poured into the spaces above the body members of lens caps 30 on respective sides of the indicia bars 26 until the plastic material is flush with the front faces 37 of the bars 36 and with the forward edges of frame 36. This liquid resin is then cured in any conventional manner (as by subjecting it to heat or the chemical action of a catalyst previously mixed with the liquid resin) until the assembly of lens caps and the embedding body of resin (indicated at 40) becomes united in a solid indicator body of plastic material having a flat front face in which the forward faces 37 of indicia bars 26 are exposed in flush relation to the embedding plastic body.

Where the indicia characters 3, 0, 8, 2, 1 are of slanted form as shown, the lens caps 30, although they may be of rectangular plan form, are of somewhat greater length than breadth. The indicia bars 26, extending diagonally between opposite corners thereof, are correspondingly disposed at an angle departing from a 45° angle to the extent that the slanted sides of frames 36 depart from the vertical. The corners 33 are correspondingly truncated so as to match flatly against the sides of frame 36 with the indicia bars 21 parallel thereto.

Alternatively, the lens caps can be of parallelogram plan form, of either equilateral or elongated proportions depending upon the proportions desired in the indicia characters to be displayed.

It may now be noted that in a lens cap whose indicia bar extends horizontally (at positions $a$, $d$ and $g$) the diagonal inclination of indicia bar 26 is from the upper left to the lower right corner of the lens cap as viewed with its longer side horizontal, whereas in a lens cap having its indicia bar extending from top to bottom, the inclination is from lower left to upper right corner (FIG. 7) when the face of the lens cap is viewed with its longer sides disposed horizontally. Thus the faces of the lens caps are arranged in "rights" and "lefts," and two series of lens cap configurations are therefore required, the lens caps at positions $a$, $d$ and $g$ being of one series and the lens caps at positions $b$, $c$, $e$ and $f$ being of the other series.

Where the indicator units are of strictly rectangular form instead of the slanted style, the indicator caps may be exactly square except for their truncated corners, the indicia bars 26 will have a diagonal inclination at exactly 45°, and all of the lens caps can accordingly be of a single series of uniform configuration.

The lens caps 30 are molded from translucent synthetic resin plastic material adapted to transmit the light rays from light bulbs 32 perpendicularly through the indicia bars 26 to the forward indicator faces 37 thereof. Some advantage is gained by using an acrylic resin such as polymethylmethacrylate, having special internal light-channeling characteristics, and by slightly roughening the indicator faces 37 for maximum emission of concentrate light rays at said faces. However, since the line of ray transmission is direct and perpendicular from the lamps 32 to the indicator faces 37, other translucent plastic resins can be satisfactorily employed, and faces 37 can be smooth.

The covering body 40 is of an opaque synthetic resin plastic material particularly adapted for bonding to the surfaces of the lens caps, and preferably one that is cured by mixing with the liquid base resin, immediately preparatory to pouring the liquid resin into the frames 36, an activating catalyst which sets up an exothermic reaction by which the resin is cured to a solid state. A satisfactory material is an epoxy resin, supplied in liquid form and activated by a catalyst which is mixed therewith preparatory to pouring.

In the assembled multiple indicator panel as shown in FIGS. 1–4, the several indicator units 3, 0, 8, 2, 1 are assembled with their forward indicator faces in contact with the rear face of legend plate 25 (FIGS. 2–4) and their upper and lower margins positioned against the flanges 13 of face plate 11. They are held in contact with legend plate 25 by the lamp holder 14.

*Lamp holders.*—There are a series of lamp holders 14, one for each of the indicator units 3, 0, 8, 2, 1, and of the same marginal configuration and dimensions. Each lamp holder comprises a block of insulating material 41 (e.g. synthetic resin plastic) and a sheet metal ground contact plate 42 secured to its rear face. Formed in insulator block 41 are a series of cylindrical openings 43 to receive the base portions 44 of lamps 32. Mounted in the rear side of block 41 coaxially with openings 43 and in contact with plate 42 are respective lamp socket bushings 45 of cylindrical collar form in which lamp bases 44 are mounted, thus providing a common ground connection to the base terminals of lamps 32. The forward ends of lamp bases 44 are extended into the lens cap recesses 31, and provide "floating" positioning of the lamp holder 14 in registry with the array of indicator units 3, 0, 8, 2, 1, with the bulb tips of the lamps wholly contained within the recesses 31.

*Contact blocks.*—Contact blocks 15 have the same marginal configuration and dimensions as lamp holders 14. There is a contact block 15 for each lamp holder, and each includes a block 47 of insulating material having its upper and lower ends secured as by rivets 48 to Z-bars 16. Each contact block 47 has a group of receptacle openings 49 mounting respective contact units of conventional construction and therefore designated only generally by the numeral 50. The receptacles 49 are located so as to position the respective contact units 50 in axial alignment with the respective lamp bulbs 32, and for spring loaded engagement with the central end contacts thereof, thus retaining the lamp bulbs 32 in assembly with their conventional flanged base contacts bearing against the ground contact plate 42. A series of ground contact terminal pins 51, loaded by conical springs 52, provide connection to the ground contact plates 42 of the respective units 3, 0, 8, 2, 1, there being one of the ground terminals 51 for each of these units.

OPERATION

In setting up the indicator for use, the terminals 50 are wired in parallel, as indicated in FIG. 6, to one or more common power lines 60 which may be connected to a single control switch 61 or to several control switches, one for each of the indicator units 3, 0, 8, 2, 1, depending upon whether the full array of indicator units is to be always illuminated as a group or whether selected units are to be individually illuminated. In any event, the ground terminals 51 are wired in parallel to a common ground conductor 61. The source of power for energizing the lamps is shown at 62. Power lines 60 and ground conductor 61 could be reversed if desired.

The individual arrangement of contact blocks 15 makes it possible to wire the terminals 50 together at the factory for the several unit indicia to be displayed by respective indicator units. The indicator units themselves are uniformly identical, and differently wired contact blocks may be associated with the identical units to provide the selective display of different indicia characters.

We claim:
1. A variable-indicia indicator unit comprising: a group of lens caps each having a plurality of flat sides arranged in polyhedral configuration, each having a front face of generally parallelogram shape and an integral light-transmitting bar projecting beyond said front face and extending diagonally between opposite corners thereof; means binding said group of lens caps in assembly with adjoining flat sides thereof fitted to one another with said light transmitting bars arranged in a master pattern such that by illumination of selected bars of said pattern, a selected indicia character will be displayed thereby, the sides of said lens caps being disposed diagonally with relation to a major axis of said pattern; opaque light-blocking means covering said front faces of said lens caps, said light transmitting bars projecting through said light blocking means and having exposed front faces for illuminated presentation of said indicia character; and a plurality of individual illuminating elements associated with the rear sides of respective lens caps for individual illumination of selected light transmitting bars to present a selected indicia character.

2. An indicator unit as defined in claim 1, wherein said opaque light-blocking means comprises a binding body of solidified opaque plastic material in which said lens caps are embedded, said plastic body having a front face flush with the front faces of said indicia elements.

3. An indicator unit as defined in claim 1, wherein said group of lens caps includes marginal caps having beveled corners at the margins of the group; and a mounting frame of parallelogram form framing said group of caps and having inner faces against which said beveled corners are seated in flat face-to-face engagement.

References Cited by the Examiner
UNITED STATES PATENTS

| | | | |
|---|---|---|---|
| 1,660,254 | 2/28 | Carroll | 340—324 |
| 2,414,527 | 1/47 | Hudson | 340—381 |
| 2,785,383 | 3/57 | Foster | 174—52.6 |
| 2,843,845 | 7/58 | Vozza | 340—324 |
| 2,877,584 | 3/59 | Dupre | 340—378 |
| 2,953,776 | 9/60 | Blutman et al. | 340—324.1 |
| 2,998,597 | 8/61 | Edwards | 340—78 |

FOREIGN PATENTS 1,232,895  10/60  France.

NEIL C. READ, *Primary Examiner.*

IRVING L. SRAGOW, *Examiner.*